(12) United States Patent
Takaoka et al.

(10) Patent No.: US 9,691,546 B2
(45) Date of Patent: Jun. 27, 2017

(54) ELECTRONIC PART AND METHOD FOR FORMING JOINT STRUCTURE OF ELECTRONIC PART AND JOINING OBJECT

(71) Applicant: MURATA MANUFACTURING CO., LTD., Nagaokakyo-Shi, Kyoto-fu (JP)

(72) Inventors: Hidekiyo Takaoka, Nagaokakyo (JP); Kosuke Nakano, Nagaokakyo (JP); Yutaka Ota, Nagaokakyo (JP); Kenichi Kawasaki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 217 days.

(21) Appl. No.: 14/477,957

(22) Filed: Sep. 5, 2014

(65) Prior Publication Data

US 2015/0034701 A1    Feb. 5, 2015

Related U.S. Application Data

(63) Continuation of application No. PCT/JP2013/053239, filed on Feb. 12, 2013.

(30) Foreign Application Priority Data

Mar. 5, 2012    (JP) ................................ 2012-048028

(51) Int. Cl.

| | |
|---|---|
| *H01G 4/228* | (2006.01) |
| *H01G 4/30* | (2006.01) |
| *H01G 2/10* | (2006.01) |
| *H01G 4/232* | (2006.01) |
| *B23K 1/00* | (2006.01) |

(Continued)

(52) U.S. Cl.
CPC ........... *H01G 2/106* (2013.01); *B23K 1/0016* (2013.01); *H01G 4/008* (2013.01); *H01G 4/012* (2013.01); *H01G 4/12* (2013.01); *H01G 4/232* (2013.01); *H01G 4/2325* (2013.01); *H01G 4/248* (2013.01); *H01G 4/30* (2013.01)

(58) Field of Classification Search
CPC ....... H01G 4/2325; H01G 4/232; H01G 4/228
USPC ........................................... 361/306.1, 306.3
See application file for complete search history.

(56) References Cited

U.S. PATENT DOCUMENTS

| | | |
|---|---|---|
| 2002/0100986 A1 | 8/2002 | Soga et al. |
| 2003/0224197 A1 | 12/2003 | Soga et al. |

(Continued)

FOREIGN PATENT DOCUMENTS

| | | |
|---|---|---|
| CN | 101658929 A | 3/2010 |
| EP | 1965397 A1 | 9/2008 |

(Continued)

OTHER PUBLICATIONS

International Search Report issued for PCT/JP2013/053239, mailing date Mar. 26, 2013.
PCT/JP2013/053239 Written Opinion dated Mar. 13, 2013.

*Primary Examiner* — Eric Thomas
(74) *Attorney, Agent, or Firm* — Arent Fox LLP

(57) ABSTRACT

An electronic part including an electronic part main body and an external electrode on the surface of the electronic part main body. The external electrode includes at least one alloy layer selected from among a Cu—Ni alloy layer and a Cu—Mn alloy layer, and an antioxidant film formed on the outer side of the alloy layer. The antioxidant film is one of a Sn-containing film, a noble metal film, and an organic substance film.

11 Claims, 3 Drawing Sheets

(51) Int. Cl.
*H01G 4/008* (2006.01)
*H01G 4/012* (2006.01)
*H01G 4/12* (2006.01)
*H01G 4/248* (2006.01)

(56) References Cited

U.S. PATENT DOCUMENTS

| | | | |
|---|---|---|---|
| 2008/0068778 A1 | 3/2008 | Taniguchi et al. | |
| 2008/0118721 A1 | 5/2008 | Horie et al. | |
| 2009/0139754 A1* | 6/2009 | Ikarashi | H01B 1/22 174/257 |
| 2009/0154055 A1* | 6/2009 | Takashima | H01G 4/30 361/301.4 |
| 2010/0014214 A1* | 1/2010 | Yamazaki | B32B 18/00 361/321.4 |
| 2012/0156512 A1 | 6/2012 | Nakano et al. | |
| 2013/0088810 A1* | 4/2013 | Yang | H01G 4/2325 361/306.3 |

FOREIGN PATENT DOCUMENTS

| | | | |
|---|---|---|---|
| EP | 2065908 A1 | | 6/2009 |
| JP | 06-036969 | | 2/1994 |
| JP | H08-138902 A | | 5/1996 |
| JP | H1167588 A | | 3/1999 |
| JP | 2000-243662 A | | 9/2000 |
| JP | 2002-015946 A | | 1/2002 |
| JP | 2002015946 A | | 1/2002 |
| JP | 2002-158137 A | | 5/2002 |
| JP | 2002158137 A | | 5/2002 |
| JP | 2002254194 A | | 9/2002 |
| JP | 2003224028 A | * | 8/2003 |
| JP | 2003-332731 A | | 11/2003 |
| JP | 2003318059 A | * | 11/2003 |
| JP | 2004055679 A | * | 2/2004 |
| JP | 2006-080428 A | | 3/2006 |
| JP | 2006080428 A | | 3/2006 |
| JP | 2008-078593 A | | 4/2008 |
| JP | 2008-300769 A | | 12/2008 |
| JP | 2011-187774 A | | 9/2011 |
| JP | 2012023303 A | | 2/2012 |
| KR | 10-0755654 B1 | | 9/2007 |
| KR | 2008-0061719 A | | 7/2008 |
| WO | WO 2005036571 A1 | | 4/2005 |
| WO | WO-2011-027659 A1 | | 3/2011 |
| WO | WO 2011027659 A1 | | 3/2011 |

* cited by examiner

ELECTRONIC PART AND METHOD FOR FORMING JOINT STRUCTURE OF ELECTRONIC PART AND JOINING OBJECT

CROSS REFERENCE TO RELATED APPLICATIONS

The present application is a continuation of International application No. PCT/JP2013/053239, filed Feb. 12, 2013, which claims priority to Japanese Patent Application No. 2012-048028, filed Mar. 5, 2012, the entire contents of each of which are incorporated herein by reference.

FIELD OF THE INVENTION

The present invention relates to an electronic part and a method for forming a joint structure of an electronic part and a joining object, and more particularly to an electronic part which can maintain high joint reliability between an external electrode and a joining object at elevated temperatures, and a method for forming a joint structure of an electronic part and a joining object, which has high joint reliability at elevated temperatures.

BACKGROUND OF THE INVENTION

Surface-mounted electronic parts such as a chip capacitor and a chip inductor are usually mounted by soldering an external electrode formed in an electronic part main body, for example, to an electrode for mounting disposed on a substrate.

By the way, there is proposed, as an external electrode arranged in such an electronic part, an external electrode which has a bilayer structure having an inner layer in contact with the surface of a bare chip made of a ceramic sintered body and an outer layer laminated on the inner layer, and is formed by baking a conductive paste containing a metal powder and glass frits, and in which the metal powder in the conductive paste for forming the inner layer and the outer layer contains 80 to 95% by weight of Ag and 5 to 20% by weight of Pd, the glass frit contains 0 to 40% by weight of PbO, 35 to 65% by weight of $B_2O_3$ and 20 to 55% by weight of ZnO as main components, and the conductive paste contains the glass frit in an amount of 2 to 6% by weight with respect to the metal powder, and the inner layer and the outer layer are formed of the conductive paste of the same composition (refer to Patent Document 1).

The external electrode described in Patent Document 1 aims at improving a soldering property which is problematic in the chip type electronic part by optimizing the structure of the external electrode and the composition (metal powder, glass) of a conductive paste for forming an electrode to suppress floating of glass to the surface of the external electrode.

However, in the case of the external electrode described in Patent Document 1, there is a problem that, for example, when mounting is performed by using common Pb-free solder which contains Sn as a main component, Ag in an amount of 3% by weight, and Cu in an amount of 0.5% by weight, the electronic part falls off (i.e., the strength at a high temperature is deteriorated in a soldered portion) in the reflow repeatedly carried out multiple times after the mounting or when the chip type electronic part is used in a high-temperature environment as a car-mounted electronic part.

Patent Document 1: Japanese Patent Laid-open Publication No. 6-36969

SUMMARY OF THE INVENTION

The present invention was made to solve the above-mentioned problems, and it is an object of the present invention to provide an electronic part which has excellent heat resistance of a soldered portion in mounting the electronic part by soldering, hardly causes deterioration of the solder wettability by the oxidation of the external electrode at stages up to mounting, and can perform highly reliable mounting, and a method for forming a joint structure having high joint reliability at elevated temperatures and high heat resistance.

In order to solve the above-mentioned problems, the electronic part of the present invention is an electronic part including an electronic part main body and an external electrode formed on a surface of the electronic part main body, wherein the external electrode includes:

at least one alloy layer selected from among a Cu—Ni alloy layer and a Cu—Mn alloy layer, and an antioxidant film which is formed on an outer side of the alloy layer.

In the present invention, examples of the external electrode formed on the surface of the electronic part main body include external electrodes of surface-mounted electronic parts such as a chip capacitor and a chip inductor, and surface electrodes formed on the surfaces of printed boards or multi-layer boards.

Further, in the present invention, the alloy layer may be a layer formed by a method of forming a thick film, or may be a layer formed by a method of forming a thin film such as plating or vapor deposition.

Further, in the present invention, another electrode layer such as a Cu thick-film electrode layer may be further disposed on a lower side of the alloy layer.

In the present invention, the antioxidant film preferably includes a Sn-containing film containing Sn.

When the antioxidant film includes the Sn-containing film, since the Sn-containing film is wetted with solder in a soldering step, soldering defects in mounting can be suppressed.

Further, the antioxidant film preferably includes a noble metal film made of a noble metal.

When the antioxidant film includes the noble metal film, since a reaction of the alloy layer with Sn (e.g., Sn contained in the joining material or the joining object, or Sn, if any, contained in the external electrode) can be delayed to the time when the noble metal film is consumed, it is possible to further ensure soldering at the time of mounting by controlling the timing when the intermetallic compound is produced by the reaction of the alloy layer with tin.

Further, the antioxidant film preferably includes an organic substance film made of an organic substance.

When the antioxidant film is an organic film, since no composition variation is generated in the external electrode (alloy layer) or the joining material, mechanical strength or thermal properties of the electronic part or the joint portion can be prevented from varying.

The alloy layer is preferably either one of a Cu—Ni alloy layer containing Ni in a proportion of 3 to 30% by weight and a Cu—Mn alloy layer containing Mn in a proportion of 3 to 30% by weight.

By satisfying the above-mentioned requirements, it becomes possible to realize a rapid diffusion action between a metal material composing the alloy layer of the external electrode and Sn.

Further, the alloy layer is more preferably either one of a Cu—Ni alloy layer containing Ni in a proportion of 5 to 20% by weight and a Cu—Mn alloy layer containing Mn in a proportion of 5 to 20% by weight.

By satisfying the above-mentioned requirements, it becomes possible to more effectively realize a rapid diffusion action between a metal material composing the alloy layer of the external electrode and Sn.

Further, the electronic part main body is a ceramic laminate including a plurality of ceramic layers and internal electrode layers arranged between the ceramic layers in such a manner that a part of the internal electrodes is led out to end faces, and the external electrodes are preferably arranged at the end faces to which the internal electrode layers are led out so as to be electrically conductive to the internal electrode layers.

In general, the laminated ceramic electronic part has the above-mentioned constitution, and the present invention can be suitably used for such a laminated ceramic electronic part.

A method for forming a joint structure of the present invention is a method for forming a joint structure having a structure in which an external electrode formed on a surface of an electronic part main body is joined to a joining object, including:

a step of preparing an electronic part in which an external electrode having at least one alloy layer selected from among a Cu—Ni alloy layer and a Cu—Mn alloy layer, and an antioxidant film formed on the outer side of the alloy layer is formed on the surface of the electronic part main body;

a step of preparing a joining material containing Sn;

a step of preparing a joining object being an object to which the external electrode is joined; and a heat treatment step of performing heat treatment with the joining material interposed between the external electrode and the joining object, wherein the alloy layer of the external electrode is reacted with Sn contained in the joining material to produce an intermetallic compound in the heat treatment step.

Further, another method for forming a joint structure of the present invention is a method for forming a joint structure having a structure in which an external electrode formed on a surface of an electronic part main body is joined to a joining object, including:

a step of preparing an electronic part in which an external electrode having at least one alloy layer selected from among a Cu—Ni alloy layer and a Cu—Mn alloy layer, and an antioxidant film formed on the outer side of the alloy layer and containing Sn is formed on the surface of the electronic part main body;

a step of preparing a joining object being an object to which the external electrode is joined; and a heat treatment step of heat-treating the external electrode and the joining object in a state of being in contact with each other, wherein the alloy layer of the external electrode is reacted with Sn contained in the antioxidant film of the external electrode to produce an intermetallic compound in the heat treatment step.

Also in the method for forming a joint structure of the present invention, examples of the external electrode formed on the surface of the electronic part main body include external electrodes of surface-mounted electronic parts such as a chip capacitor and a chip inductor, and surface electrodes formed on the surfaces of printed boards or multi-layer boards.

Further, in the method for forming a joint structure of the present invention, examples of the joining object include metal terminals or metal wirings to be connected to the above-mentioned external electrodes, and terminal electrodes (external electrodes) of other electronic parts.

The electronic part of the present invention can prevent the surface of the external electrode from being oxidized to suppress the occurrence of soldering defects in mounting the electronic part since the external electrode formed on the surface of the electronic part main body is configured to include at least one alloy layer selected from among a Cu—Ni alloy layer and a Cu—Mn alloy layer, and an antioxidant film formed on the outer side of the alloy layer.

That is, in the case where the outermost layer of the external electrode is at least one alloy layer selected from among the Cu—Ni alloy layer and the Cu—Mn alloy layer, sufficient solder wettability may not be attained due to the oxidation of the alloy layer, but in the present invention, deterioration of the solder wettability due to the oxidation of the alloy layer can be prevented to secure a good soldering property because the antioxidant film is formed on the outer side of the alloy layer.

In the electronic part of the present invention, when the antioxidant layer includes the Sn-containing layer, since the rapid diffusion between the Cu—Ni alloy and/or the Cu—Mn alloy and Sn occurs in a reflow heat treatment process in joining the electronic part to the joining object and most of Sn is expelled, an intermetallic compound having a melting point of 400° C. or more is produced in a joint portion between the electronic part and the joining object (for example, an electrode for mounting on a substrate). As a result of this, it is possible to obtain a joint portion (soldered joint portion) having high strength at a high temperature, which does not cause falling off of an electronic part when reflow is carried out multiple times after an electronic part is mounted or when the mounted electronic part (for example, car-mounted electronic part) is used in a high-temperature environment.

In addition, the above-mentioned rapid diffusion between the Cu—Ni alloy and/or the Cu—Mn alloy and Sn occurs since the reaction is repeated while peeling and dispersing the intermetallic compound in Sn melted in a heat treatment step.

Since Sn rapidly turns into an intermetallic compound having a melting point of 400° C. or more by the rapid diffusion, and is solidified, the occurrence of solder burst by the internal pressure of the external electrode can be prevented.

Further, since most of Sn is expelled by the rapid diffusion, the occurrence of whiskers, which is a problem in the case where the Sn layer is present at the outermost layer, can be suppressed and prevented, for example, even when a Sn plating layer is formed at the outermost layer of the external electrode to make it possible to supply Sn from the external electrode itself.

In the method for forming a joint structure of the present invention, since heat treatment is performed with the joining material containing Sn interposed between the external electrode, which is formed on the surface of the electronic part main body and has at least one alloy layer selected from among a Cu—Ni alloy layer and a Cu—Mn alloy layer, and an antioxidant film formed on the outer side of the alloy layer, and the object to be joined to the external electrode, and thereby, the alloy layer of the external electrode is reacted with Sn contained in the joining material to produce an intermetallic compound, it is possible to reduce Sn through a rapid diffusion reaction between the alloy layer and Sn in the joining material, and form a joint structure having excellent heat resistance of a joint portion (soldered portion) efficiently.

Further, since the external electrode includes the antioxidant film, wettability of the external electrode to a joining material such as solder is good, and therefore the occurrence of soldering defects in mounting the electronic part can be suppressed.

Further, since the electronic part is steadily joined to the joining object, for example, it is possible to prevent the electronic part from falling off from the joining object (electrode for mounting on a substrate) when reflow is carried out multiple times after the electronic part is mounted or when the mounted electronic part is used in a high-temperature environment.

Further, in another method for forming a joint structure of the present invention, since the external electrode, which is formed on the surface of the electronic part main body and has at least one alloy layer selected from among a Cu—Ni alloy layer and a Cu—Mn alloy layer, and an antioxidant film formed on the outer side of the alloy layer and containing Sn, and the joining object are heat-treated in a state of being in contact with each other, and thereby the alloy layer of the external electrode is reacted with Sn contained in the antioxidant film of the external electrode to produce an intermetallic compound, it is possible to join the electronic part to the joining object efficiently without using the joining material containing Sn, and it is possible to reduce Sn through a rapid diffusion reaction between the alloy layer and Sn in the antioxidant film to secure adequate heat resistance of a joint portion (soldered portion).

In addition, when the electronic part is joined to the joining object without using the joining material containing Sn, it is preferred that a relationship between the thickness of the Cu—Ni alloy layer and/or the Cu—Mn alloy layer and the thickness of the antioxidant film (Sn-containing film) is adjusted in such a manner that the thickness of the Sn-containing film is 3 to 10 μm with respect to 10 μm of that of the alloy layer.

Further, in the case of the joint structure formed by the method of the present invention, since the electronic part is reliably joined to the joining object, for example, it is possible to prevent the electronic part from falling off from the joining object (electrode for mounting on a substrate) when reflow is carried out multiple times after the electronic part is mounted or when the mounted electronic part is used in a high-temperature environment.

DETAILED DESCRIPTION OF THE INVENTION

Embodiments of the present invention will be shown below, and characteristics of the present invention will be described in more detail.

Figure 1:
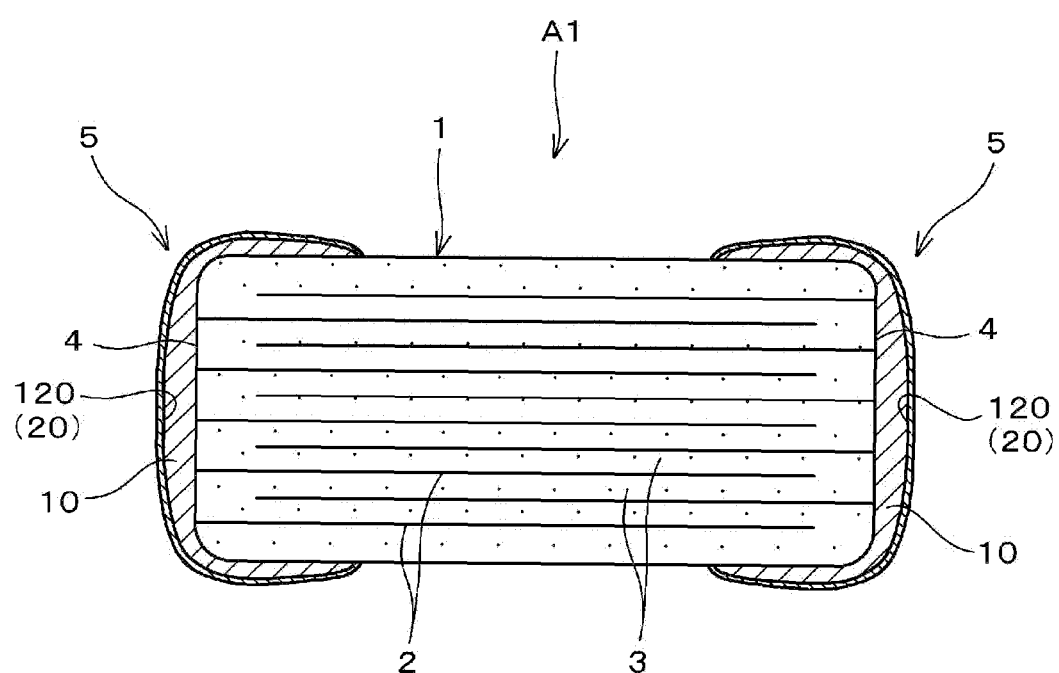
FIG. 1 is a sectional view schematically showing a constitution of an electronic part (laminated ceramic capacitor) of an embodiment of the present invention.
Figure 2:
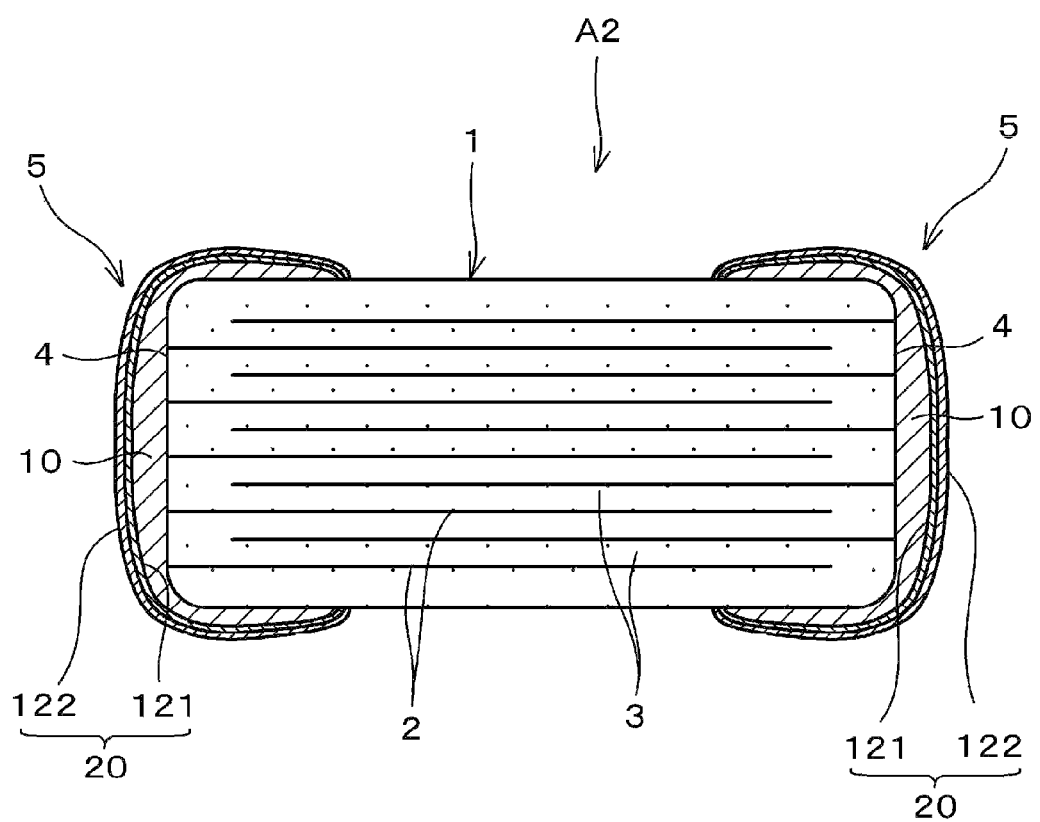
FIG. 2 is a sectional view schematically showing a constitution of an electronic part (laminated ceramic capacitor) of another embodiment of the present invention.
Figure 3:
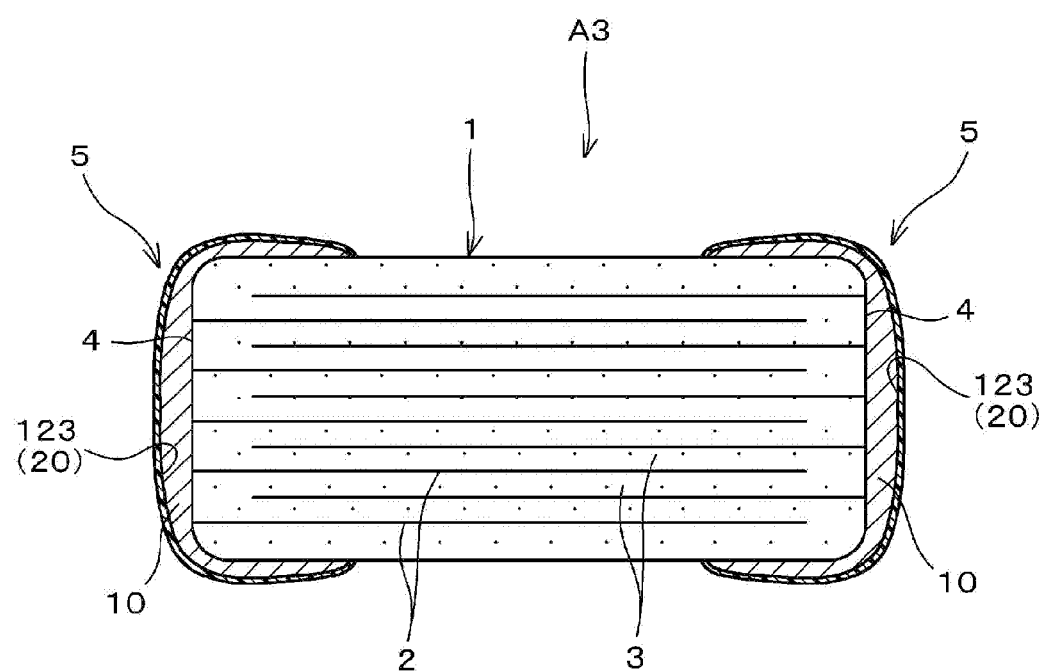
FIG. 3 is a sectional view schematically showing a constitution of an electronic part (laminated ceramic capacitor) of still another embodiment of the present invention.

In these embodiments, laminated ceramic capacitors each having a structure as shown in FIG. 1, 2 or 3 were prepared as the electronic part of the present invention.

All of electronic parts (laminated ceramic capacitors) A1, A2 and A3 shown in FIGS. 1, 2 and 3 have a structure in which a pair of external electrodes 5, 5 are arranged so as to be electrically conductive to internal electrodes 2 at both end faces 4, 4 of a laminated ceramic device (electronic part main body) 1 having a structure in which the internal electrodes 2 arranged within the ceramic laminate (laminated ceramic device) 1 being an electronic part main body are laminated with ceramic layers (dielectric ceramic layers) 3 as dielectric layers interposed therebetween, and alternately pulled out to both the end faces 4, 4 of the ceramic laminate 1.

The external electrode 5 includes a Cu—Ni alloy layer or a Cu—Mn alloy layer (hereinafter, also referred to as simply an "alloy layer") 10, and an antioxidant film 20 which is formed on the outer side of the alloy layer 10.

For example, the electronic part A1 shown in FIG. 1 includes an antioxidant film 20 of a monolayer structure composed of one layer of a plating layer 120 as an antioxidant film.

On the other hand, the electronic part A2 shown in FIG. 2 includes an antioxidant film 20 of a bilayer structure composed of a lower plating layer 121 and an upper plating layer 122 formed thereon as an antioxidant film.

Further, the electronic part A3 shown in FIG. 3 includes an antioxidant film 20 composed of an organic substance film 123 made of an organic substance formed by subjecting the alloy layer to rustproofing treatment as an antioxidant film.

[Preparation of Sample]

Hereinafter, a method for producing the electronic part (laminated ceramic capacitor) will be described.

First, a ceramic green sheet predominantly composed of barium titanate was prepared. Then, a conductive paste (paste for an internal electrode) containing a Ni powder as a conductive component was applied to the surface of the ceramic green sheet by screen printing to form an internal electrode paste pattern.

Then, a plurality of the ceramic green sheets having the internal electrode paste pattern formed thereon were laminated and press-bonded to form a laminate.

Next, the laminate was cut along a direction of lamination, that is, a direction of thickness to obtain chip laminates (unfired laminates serving as ceramic laminates 1 (FIGS. 1 to 3) after firing) in which the internal electrode paste pattern was alternately exposed to one side and the other side of the end faces (cut end faces) opposed to each other.

Then, each of the unfired laminates was fired at 1300° C. for 1 hour in the air to obtain a ceramic laminate 1 (FIGS. 1 to 3). Dimensions of the ceramic laminate 1 were 0.8 mm in width (W), 1.6 mm in length (L), and 0.8 mm in thickness (W).

Subsequently, a Cu—Ni thick-film paste or Cu—Mn thick-film paste, as a conductive paste for forming an external electrode, was applied to both end faces 4, 4 of the ceramic laminate 1.

As the Cu—Ni thick-film paste, a paste-like material, which was prepared by mixing a Cu—Ni powder having a particle size of 3 μm, glass frits, an organic binder, a dispersant and an organic solvent, and dispersing/kneading the resulting mixture with a ball mill and a roll mill, was used.

As the Cu—Mn thick-film paste, a paste-like material, which was prepared by similarly mixing a Cu—Mn powder having a particle size of 3 μm, glass frits, an organic binder, a dispersant and an organic solvent, and dispersing/kneading the resulting mixture with a ball mill and a roll mill, was used.

The proportion of Ni in the Cu—Ni alloy powder composing the fired type Cu—Ni thick-film paste, and the proportion of Mn in the Cu—Mn alloy powder composing the fired type Cu—Mn thick-film paste were varied within the range of the proportions shown in the sample Nos. 1 to 25 in Table 1 and the sample Nos. 101 to 129 in Table 2, respectively.

In addition, for example, the numeral 3 in "Cu-3Ni" in the column of Composition of Alloy Layer of the sample No. 1 in Table 1 indicates the value of weight percentage of an appropriate component (Ni in this case). That is, in this case, the numeral represents that the proportion of Ni in the Cu—Ni alloy powder is 3% by weight. The proportion of Ni and the proportion of Mn of other samples are denoted in the same manner.

Then, alloy layers which are thick-film electrodes (thick-film electrodes (Cu—Ni alloy layer or Cu—Mn alloy layer)) 10 (FIGS. 1 to 3) were formed by firing the ceramic laminate 1 having the Cu—Ni thick-film paste or the Cu—Mn thick-film paste, which is for forming an external electrode and is of a fired type, applied to both end faces 4, 4.

In addition, it was verified by the cross-section observation that the thickness of the fired alloy layer 10 was 100 to 150 μm.

Next, the samples (electronic parts (laminated ceramic capacitors)) A1 of the sample Nos. 1 to 25 in Table 1, and the samples (electronic parts (laminated ceramic capacitors)) A2 of the sample Nos. 101 to 129 in Table 2 were prepared by forming plating layers having the metal composition and thickness as shown in the sample Nos. 1 to 25 in Table 1 and the sample Nos. 101 to 129 in Table 2, as antioxidant films 20, on the surfaces of the alloy layers 10 formed at end faces 4 of the ceramic laminates 1.

In addition, in the column of composition of plated metal in Table 2, for example, the description of Sn/Au in the sample of the sample No. 101 indicates that a lower side is a Sn plating layer and an upper side is an Au plating layer. Further, the description of Sn/Au/Sn/Au in the sample of the sample No. 119 indicates that the respective plating layers of Sn, Au, Sn and Au are formed in order from a lower side to an upper side.

The samples (electronic parts (laminated ceramic capacitors)) A1 of the sample Nos. 1 to 25 in Table 1 include, as antioxidant films, antioxidant films 20 of a monolayer structure composed of one layer of a plating layer 120, as shown in FIG. 1.

On the other hand, the samples (electronic parts (laminated ceramic capacitors)) A2 of the sample Nos. 101 to 129 in Table 2 include, as antioxidant films, antioxidant films 20 of a bilayer structure composed of a lower plating layer 121 and an upper plating layer 122 formed thereon, as shown in FIG. 2.

In addition, all of the plating layers were formed by electrolytic plating. The film thickness of the plating layers was controlled by adjusting the film-forming time.

Further, the sample (electronic part (laminated ceramic capacitor)) A3 of the sample No. 201 in Table 3 was prepared by forming an organic substance film by subjecting the surface of the alloy layer 10 formed at an end face 4 of the ceramic laminate 1 to rustproofing treatment.

The sample (electronic part A3) of the sample No. 201 in Table 3 includes an antioxidant film 20 of a monolayer structure composed of one layer of the organic substance film 123 formed by subjecting the alloy layer to rustproofing treatment, as shown in FIG. 3.

In addition, for example, a publicly known organic substance film can be formed on the surface of the alloy layer 10 by a method of immersing the electronic part in an imidazole-based aqueous solution or a benzotriazole-based aqueous solution for a certain time, and then washing the electronic part with water and drying the electronic part as rustproofing treatment.

Further, for comparison, a sample (sample of the sample No. 26 in Table 1 (comparative example)) using a Cu layer for an external electrode main body for which the Cu—Ni alloy layer or the Cu—Mn alloy layer is used in the case of the present invention and including, as an antioxidant film (plating layer), a lower Ni plating layer and an upper Sn plating layer formed thereon, and a sample (sample of the sample No. 27 in Table 1 (comparative example)) using the same Cu—Ni alloy layer as in the case of the present invention for the external electrode main body but not including an antioxidant film were prepared, and these samples were subjected to the following evaluation of characteristics together with the above-mentioned samples complying with the requirements of the present invention.

[Evaluation of Characteristics]

In evaluating characteristics, a substrate (copper-clad FR4 glass-epoxy substrate for a laminated ceramic electronic part) provided with a Cu electrode (joining object) was prepared as a substrate for mounting by soldering the electronic part (laminated ceramic capacitor) being a sample prepared in the way described above. Then, a Sn-3Ag-0.5Cu solder paste (old Military Specification RA flux) manufactured by SENJU METAL INDUSTRY CO., LTD. was printed on the surface of the Cu electrode by using a metal mask. The thickness of the metal mask was 50 μm.

In addition, in the expressions of the above-mentioned material (solder paste), for example, the numeral 3 of "Sn-3Ag-0.5Cu" indicates the value of weight % of the relevant component (Ag in this case), and the numeral 0.5 indicates the value of weight % of Cu.

Thereafter, each electronic part (laminated ceramic capacitor) being a sample prepared in the way described above was mounted on the printed solder paste, and then the external electrode of the electronic part was joined to the Cu electrode of the glass-epoxy substrate in the conditions of 150° C. in preheating and 250° C. in main heating by using a reflow apparatus to electrically and mechanically connect the external electrode to the Cu electrode.

Joint structures obtained in the way described above were used as samples for characteristic evaluation, and their characteristics were evaluated by the following methods.

<<Evaluation of Soldering Property>>

Each of the samples for characteristic evaluation was observed at a magnification of 10 times by using a stereomicroscope, and the soldering property was determined by the wetting angle (contact angle) of solder of each of the end faces 4 (FIGS. 1, 2 and 3) of the electronic parts (laminated ceramic capacitors) A1, A2 and A3. The sample which formed a fillet having a contact angle less than 90° was rated as good (○) and the sample which formed a fillet having a contact angle of 90° or more was rated as defective (x).

<<Evaluation of Strength at High Temperature>>

A sample for characteristic evaluation, in which a surface of a substrate joined to an electronic part (laminated ceramic capacitor) faces downward, was placed in a hot air forced circulation oven at 250° C. for 5 minutes, and then taken out, and the joint strength at a high temperature (strength at a high temperature) was evaluated by checking the presence or absence of falling off of the electronic part from the substrate.

At this time, the sample in which falling off of the electronic part was found was rated as defective (x). Moreover, in order to check a state of joining between the external electrode of the electronic part and the Cu electrode of the substrate through an intermetallic compound, an unreacted metal Sn component was etched, and then the presence or absence of falling off of the electronic part was investigated.

At this time, the sample in which falling off of the electronic part was found was rated as good (○) since joining was tentatively achieved, and the sample in which falling off of the electronic part was not found even after etching was rated as excellent (⊙) considering that the electronic part is firmly joined through the intermetallic compound.

The results of characteristics evaluation are shown together in Tables 1, 2 and 3.

TABLE 1

| Sample No. | Composition of Alloy Layer [% by weight] | Metal Composition of Plating Layer | Thickness of Plating Layer [μm] | Soldering Property | Strength at High Temperature |
|---|---|---|---|---|---|
| 1 | Cu—3Ni | Sn | 3 | ○ | ○ |
| 2 | Cu—5Ni | Sn | 3 | ○ | ⊙ |
| 3 | Cu—10Ni | Sn | 3 | ○ | ⊙ |
| 4 | Cu—15Ni | Sn | 3 | ○ | ⊙ |
| 5 | Cu—20Ni | Sn | 3 | ○ | ⊙ |
| 6 | Cu—30Ni | Sn | 3 | ○ | ○ |
| 7 | Cu—5Mn | Sn | 3 | ○ | ⊙ |
| 8 | Cu—10Mn | Sn | 3 | ○ | ⊙ |
| 9 | Cu—15Mn | Sn | 3 | ○ | ⊙ |
| 10 | Cu—20Mn | Sn | 3 | ○ | ⊙ |
| 11 | Cu—10Ni | Sn | 0.01 | ○ | ⊙ |
| 12 | Cu—10Ni | Sn | 10 | ○ | ⊙ |
| 13 | Cu—10Ni | Sn | 50 | ○ | ⊙ |
| 14 | Cu—10Ni | Au | 0.01 | ○ | ⊙ |
| 15 | Cu—10Ni | Au | 1 | ○ | ⊙ |
| 16 | Cu—10Ni | Au | 10 | ○ | ⊙ |
| 17 | Cu—10Ni | Ag | 1 | ○ | ⊙ |
| 18 | Cu—10Ni | Pd | 1 | ○ | ⊙ |
| 19 | Cu—10Ni | Pt | 1 | ○ | ⊙ |
| 20 | Cu—10Ni | Rh | 1 | ○ | ⊙ |
| 21 | Cu—10Ni | Au—20Sn | 1 | ○ | ⊙ |
| 22 | Cu—10Ni | Au—0.5Co | 1 | ○ | ⊙ |
| 23 | Cu—10Ni | Au—12Ni | 1 | ○ | ⊙ |
| 24 | Cu—10Ni | Au—60Ag | 1 | ○ | ⊙ |
| 25 | Cu—10Ni | Au—35Cu | 1 | ○ | ⊙ |
| 26* | Cu | Ni/Sn | 3/3 | ○ | X |
| 27* | Cu—10Ni | — | — | X | ⊙ |

*The samples of the sample Nos. 26 and 27 are samples of comparative examples which do not satisfy the requirements of the present invention.

TABLE 2

| Sample No. | Composition of Cu—Ni Alloy Layer [% by weight] | Composition of Plating Layer | Thickness of Plating Layer [μm] | Soldering Property | Strength at High Temperature |
|---|---|---|---|---|---|
| 101 | Cu—3Ni | Sn/Au | 3/1 | ○ | ○ |
| 102 | Cu—5Ni | Sn/Au | 3/1 | ○ | ⊙ |
| 103 | Cu—10Ni | Sn/Au | 3/1 | ○ | ⊙ |
| 104 | Cu—15Ni | Sn/Au | 3/1 | ○ | ⊙ |
| 105 | Cu—20Ni | Sn/Au | 3/1 | ○ | ⊙ |
| 106 | Cu—30Ni | Sn/Au | 3/1 | ○ | ○ |
| 107 | Cu—5Mn | Sn/Au | 3/1 | ○ | ⊙ |
| 108 | Cu—10Mn | Sn/Au | 3/1 | ○ | ⊙ |
| 109 | Cu—15Mn | Sn/Au | 3/1 | ○ | ⊙ |
| 110 | Cu—20Mn | Sn/Au | 3/1 | ○ | ⊙ |
| 111 | Cu—10Ni | Sn/Au | 3/0.005 | ○ | ⊙ |
| 112 | Cu—10Ni | Sn/Au | 3/0.01 | ○ | ⊙ |
| 113 | Cu—10Ni | Sn/Au | 3/10 | ○ | ⊙ |
| 114 | Cu—10Ni | Sn/Au | 0.005/1 | ○ | ⊙ |
| 115 | Cu—10Ni | Sn/Au | 0.01/1 | ○ | ⊙ |
| 116 | Cu—10Ni | Sn/Au | 10/1 | ○ | ⊙ |
| 117 | Cu—10Ni | Sn/Au | 50/1 | ○ | ⊙ |
| 118 | Cu—10Ni | Sn/Au | 3/1 | ○ | ⊙ |
| 119 | Cu—10Ni | Sn/Au/Sn/Au | 3/1/3/1 | ○ | ⊙ |
| 120 | Cu—10Ni | Sn/Ag | 3/1 | ○ | ⊙ |
| 121 | Cu—10Ni | Sn/Pd | 3/1 | ○ | ⊙ |
| 122 | Cu—10Ni | Sn/Pt | 3/1 | ○ | ⊙ |
| 123 | Cu—10Ni | Sn/Rh | 3/1 | ○ | ⊙ |
| 124 | Cu—10Ni | Sn/Au—20Sn | 3/1 | ○ | ⊙ |
| 125 | Cu—10Ni | Sn/Au—0.5Co | 3/1 | ○ | ⊙ |
| 126 | Cu—10Ni | Sn/Au—12Ni | 3/1 | ○ | ⊙ |
| 127 | Cu—10Ni | Sn/Au—60Ag | 3/1 | ○ | ⊙ |
| 128 | Cu—10Ni | Sn/Au—35Cu | 3/1 | ○ | ⊙ |
| 129 | Cu—10Ni | Au/Sn | 1/3 | ○ | ⊙ |

TABLE 3

| Sample No. | Composition of Alloy Layer [% by weight] | Rustproofing Treatment (Presence or Absence of Organic Substance Film) | Soldering Property | Strength at High Temperature |
|---|---|---|---|---|
| 201 | Cu—10Ni | Performed | ○ | ⊙ |
| 26 | Cu—10Ni | Not performed | X | ⊙ |

*The sample of the sample No. 26 (the same sample as in Table 1) is a sample of a comparative example which does not satisfy the requirements of the present invention.

In the case of the samples (electronic parts of the embodiment of the present invention) of the sample Nos. 1 to 25 in Table 1 including, as antioxidant films, antioxidant films 20 of a monolayer structure composed of one layer of a plating layer 120, as shown in FIG. 1, it was verified that a practical soldering property was provided.

Further, in the case of the samples (electronic parts of the embodiment of the present invention) of the sample Nos. 1 to 25 in Table 1, good results were achieved also in the joint strength at a high temperature (strength at a high temperature), and therefore it was verified that an electronic part-mounted substrate provided with practically sufficient strength at a high temperature is obtained by using the electronic part of the present invention.

Further, with the respective samples including the Cu—Ni alloy layer, in the case of the sample of the sample No. 1 in which the proportion of Ni is 3% by weight, and the sample of the sample No. 6 in which the proportion of Ni is 30% by weight, the strength at a high temperature was rated as good (○), and in the case of the samples of other sample Nos., the strength at a high temperature was rated as excellent (⊙). It was verified from these results that in the case where the proportion of Ni in the Cu—Ni alloy is in a range of 3 to 30% by weight, an electronic part having an external electrode provided with practically problem-free strength at a high temperature is obtained, and when the proportion of Ni is set to 5 to 20% by weight, an electronic part having an external electrode provided with more excellent strength at a high temperature is obtained.

In addition, the reason why an electronic part having an external electrode provided with particularly excellent strength at a high temperature is obtained by setting the proportion of Ni to 5 to 20% by weight is that the proportion of Ni in a range of 5 to 20% by weight particularly enhances the rapid diffusion action to facilitate the production of an intermetallic compound having a high melting point, and thereby, the amount of Sn which causes deterioration of the strength at a high temperature is reduced.

In addition, it was verified also in the case of the Cu—Mn alloy layer that when the proportion of Mn is 5 to 20% by weight, an electronic part having an external electrode provided with particularly excellent strength at a high temperature is obtained (refer to the sample Nos. 7 to 10 in Table 1).

Further, although not shown in Table 1, it was verified also in the case of the Cu—Mn alloy layer that when the proportion of Mn is in a range of 3 to 30% by weight, an electronic part having an external electrode provided with practically problem-free soldering property and strength at a high temperature is obtained.

In the case of a sample complying with the requirements of the present invention, it was verified that a self-alignment property, that is, a property that melted solder penetrates into a gap between the external electrode and the Cu electrode and the electronic part is reliably mounted on the Cu electrode, is excellent, and the joint portion can be made compact in structure to improve adaptability to high-density mounting.

On the other hand, in the case of the sample of the sample No. 26 which is a sample not complying with the requirements of the present invention, that is, a sample using a Cu layer in place of the Cu—Ni alloy layer or the Cu—Mn alloy layer for the external electrode main body (an electronic part of a comparative example), it was verified that the soldering property is excellent, but the rapid diffusion action at the time of reflow does not occur, and a sufficient intermetallic compound is not formed between the external electrode of the electronic part and the Cu electrode of the substrate, and therefore practical strength at a high temperature cannot be attained.

Further, in the case of the sample of the sample No. 27 which is a sample not complying with the requirements of the present invention, that is, a sample using the same Cu—Ni alloy layer as in the case of the present invention for the external electrode main body but not including an antioxidant film (an electronic part of a comparative example), it was verified that the rapid diffusion action at the time of reflow adequately occurs and the strength at a high temperature is excellent, but the solder wettability is low and a practical soldering property cannot be attained.

Also in the case of the samples of the sample Nos. 101 to 129 in Table 2, that is, the samples including, as antioxidant films, antioxidant films 20 of a bilayer structure each composed of a lower plating layer 121 and an upper plating layer 122 formed thereon (electronic parts of the embodiment of the present invention), as shown in FIG. 2, it was verified that there is no particular problem in the soldering property, and a practical soldering property is provided.

Further, in the case of the samples (electronic parts of the embodiment of the present invention) of the sample Nos. 101 to 129 in Table 2, good results were achieved also in the strength at a high temperature, and therefore it was verified that an electronic part-mounted substrate provided with practically sufficient strength at a high temperature is obtained by using the electronic part of the present invention.

Also in the case of the sample of the sample No. 201 in Table 3, that is, the sample including an antioxidant film 20 of a monolayer structure composed of one layer of the organic substance film formed by subjecting the alloy layer to rustproofing treatment (electronic part of the embodiment of the present invention), as shown in FIG. 3, it was verified that there is no particular problem in the soldering property, and a practical soldering property is provided.

Further, in the case of the sample (electronic part of the embodiment of the present invention) of the sample No. 201 in Table 3, good results were achieved also in the strength at a high temperature, and therefore it was verified that an electronic part-mounted substrate provided with practically sufficient strength at a high temperature is obtained by using the electronic part of the present invention.

In addition, in this embodiment, while the external electrode of the electronic part is joined to the Cu electrode of the substrate by using a solder paste in mounting the sample (electronic part) on the substrate, in the case where the antioxidant film includes the Sn-containing layer, it is also possible to react Sn contained in the alloy layer and the antioxidant film without having to use a solder paste to produce an intermetallic compound, and thereby to firmly join the external electrode to the Cu electrode by appropriately adjusting the amount of the metal contained in the Cu—Ni alloy layer and/or the Cu—Mn alloy layer and the amount of Sn contained in the antioxidant film, and heat-treating the external electrode of the electronic part and the Cu electrode on the substrate in a state of being in contact with each other. In addition, in this case, it is preferred that a relationship between the thickness of the Cu—Ni alloy layer and/or the Cu—Mn alloy layer and the thickness of the antioxidant film (Sn-containing film) is adjusted in such a manner that the thickness of the Sn-containing film is 3 to 10 μm with respect to 10 μm of that of the alloy layer.

Further, in the embodiment described above, the case in which the electronic part is a laminated ceramic capacitor, and the external electrodes are electrodes formed at end faces of the ceramic laminate (laminated ceramic device) has been described as an example, however, for example, the electronic part may be a printed board or a multi-layer board, and the external electrode may be a surface electrode (electrode for mounting) formed on the surface of the electronic part, and there is no particular restriction on the kind of the electronic part and the form of the external electrode in the present invention.

In the method for forming a joint structure of the present invention, the case in which the electronic part including the external electrode is a laminated ceramic capacitor, and the joining object is a Cu electrode formed on the substrate has been described as an example, however, the joining object may be metal terminals or metal wirings to be connected to an external electrode (surface electrode) of the electronic part, or terminal electrodes (external electrodes) of other electronic parts.

The present invention is not intended to be limited to the above-mentioned embodiments in other points, and various applications and variations may be made on the composition of the Cu—Ni alloy and/or the Cu—Mn alloy layer, the specific constitution and forming method of the antioxidant film, and the specific method and condition in forming the joint structure of the present invention within the scope of the invention.

DESCRIPTION OF REFERENCE SYMBOLS

A1, A2, A3 Electronic part (laminated ceramic capacitor)
1 Ceramic laminate (laminated ceramic device)
2 Internal electrode
3 Ceramic layer (dielectric ceramic layer)
4 End face of ceramic laminate
5 External electrode
10 Alloy layer (Cu—Ni alloy layer or Cu—Mn alloy layer)
20 Antioxidant film
120 One layer of plating layer
121 Lower plating layer
122 Upper plating layer
123 Organic substance film

The invention claimed is:

1. An electronic part comprising:
an electronic part main body; and
an external electrode on a surface of the electronic part main body, wherein the external electrode comprises:
at least one alloy layer selected from a Cu—Ni alloy layer and a Cu—Mn alloy layer, and
an antioxidant film on a side of the alloy layer distal from the surface of the electronic part main body, the antioxidant film including an Sn plating layer in direct contact with the alloy layer and an Au plating layer in direct contact with the Sn plating layer as an outermost plating layer from the alloy layer.

2. The electronic part according to claim 1, wherein the alloy layer is either one of:
a Cu—Ni alloy layer containing Ni in a proportion of 3 to 30% by weight and
a Cu—Mn alloy layer containing Mn in a proportion of 3 to 30% by weight.

3. The electronic part according to claim 1, wherein the alloy layer is either one of:
a Cu—Ni alloy layer containing Ni in a proportion of 5 to 20% by weight and
a Cu—Mn alloy layer containing Mn in a proportion of 5 to 20% by weight.

4. The electronic part according to claim 1, wherein the alloy layer has a thickness of 100-150 μm.

5. The electronic part according to claim 1, wherein
the electronic part main body is a ceramic laminate including a plurality of ceramic layers and internal electrode layers arranged between the ceramic layers in such a manner that opposed sets of the internal electrodes is led out to respective opposed end faces of the electronic part main body, and
wherein the external electrode is a first external electrode, the electronic part further comprising a second external electrode, and the first and second external electrodes are arranged at the respective opposed end faces to which the opposed sets of the internal electrode layers are led out and respectfully electrically conductive to the opposed sets of the internal electrodes.

6. A method for forming a joint structure, the method comprising:
preparing an electronic part in which an external electrode having at least one alloy layer selected from a Cu—Ni alloy layer and a Cu—Mn alloy layer is formed on the surface of the electronic part main body, and an antioxidant film is formed on a side of the alloy layer distal from the surface of the electronic part main body, the antioxidant film including an Sn plating layer in direct contact with the alloy layer and an Au plating layer in direct contact with the Sn plating layer as an outermost plating layer from the alloy layer;
preparing a joining material containing Sn;
preparing a joining object to which the external electrode is to be joined; and
performing heat treatment with the joining material interposed between the external electrode and the joining object such that the alloy layer of the external electrode is reacted with Sn contained in the joining material to produce an intermetallic compound.

7. The method for forming a joint structure according to claim 6, wherein the alloy layer is either one of:
a Cu—Ni alloy layer containing Ni in a proportion of 3 to 30% by weight and
a Cu—Mn alloy layer containing Mn in a proportion of 3 to 30% by weight.

8. The method for forming a joint structure according to claim 6, wherein the alloy layer is either one of:
a Cu—Ni alloy layer containing Ni in a proportion of 5 to 20% by weight and
a Cu—Mn alloy layer containing Mn in a proportion of 5 to 20% by weight.

9. A method for forming a joint structure, the method comprising:
preparing an electronic part in which an external electrode having at least one alloy layer selected from a Cu—Ni alloy layer and a Cu—Mn alloy layer is formed on the surface of the electronic part main body, and an Sn-containing antioxidant film is formed on a side of the alloy layer distal from the surface of the electronic part main body, the Sn-containing antioxidant film including an Sn plating layer in direct contact with the alloy layer and an Au plating layer in direct contact with the Sn plating layer as an outermost plating layer from the alloy layer;
preparing a joining object to which the external electrode is to be joined; and
heat-treating the external electrode and the joining object in a state of being in contact with each other such that the alloy layer of the external electrode is reacted with the Sn contained in the Sn-containing antioxidant film of the external electrode to produce an intermetallic compound.

10. The method for forming a joint structure according to claim 9, wherein the alloy layer is either one of:
a Cu—Ni alloy layer containing Ni in a proportion of 3 to 30% by weight and
a Cu—Mn alloy layer containing Mn in a proportion of 3 to 30% by weight.

11. The method for forming a joint structure according to claim 9, wherein the alloy layer is either one of:
a Cu—Ni alloy layer containing Ni in a proportion of 5 to 20% by weight and
a Cu—Mn alloy layer containing Mn in a proportion of 5 to 20% by weight.

* * * * *